United States Patent Office 2,949,433
Patented Aug. 16, 1960

2,949,433

RESINOUS COMPOSITION COMPRISING POLYVINYL CHLORIDE PLASTICIZED WITH ADDUCTS OF TETRAHYDROPHTHALATE AND ENDOMETHYLENEHYDROPHTHALATE ESTERS WITH FUMARATE ESTERS

Joachim Dazzi, Dayton, Ohio, assignor to Monsanto Chemical Company, St. Louis, Mo., a corporation of Delaware No Drawing. Original application Mar. 4, 1955, Ser. No. 492,300, now Patent No. 2,850,523, dated Sept. 2, 1958. Divided and this application Mar. 24, 1958, Ser. No. 723,145

5 Claims. (Cl. 260—31.8)

This invention relates to high molecular weight adducts and more particularly provides partially hydrogenated cycloalkenes having a plurality of carboxylate radicals and a process of producing the same.

An object of the invention is the provision of new and useful polycarboxylates. Another object of the invention is the preparation of viscous polycarboxylates from Diels-Alder diene synthesis addition products. Still another object of the invention is to provide from the coatings, synthetic resins and plastics, plasticizer, rubber and textile industries a new class of stable, viscous materials having a plurality of carboxylate radicals.

These and other objects of the invention hereinafter disclosed are provided by the following invention wherein there are prepared viscous adducts of (1) and alkyl fumarate having from 1 to 8 carbon atoms in the alkyl radical and (2) the completely esterified diene synthesis addition product of maleic anhydride and a conjugated dienic hydrocarbon of from 4 to 6 carbon atoms, the alcohol portion of said ester being derived from a fatty alcohol of from 1 to 8 carbon atoms.

Alkyl fumarates suitable for the present purpose are the simple diesters of fumaric acid, e.g., methyl, ethyl, isopropyl, n-propyl, n-butyl, tert-butyl, isoamyl, n-hexyl, n-heptyl, 2-ethylhexyl and n-octyl fumarate, or the mixed diesters, e.g., ethyl methyl fumarate, isopropyl n-octyl fumarate, n-amyl tert-butyl fumarate, etc.

Esterified Diels-Alder adducts of maleic anhydride and dienic hydrocarbons with which the alkyl fumarates are reacted according to the invention to give the present viscous polycarboxylates are alkyl tetrahydrophthalates or endomethylene-tetrahydrophthalates obtained in known manner by esterification of the Diels-Alder 1,4-addition products of maleic anhydride and dienes such as 1,3-butadiene, isoprene, piperylene, 2-methyl-1,3-pentadiene, 2,3-dimethyl-1,3-butadiene, cyclopentadiene, methyl-cyclopentadiene, etc. Diels-Alder addition products obtained from maleic anhydride and an open-chain conjugated dienic hydrocarbon of from 4 to 6 carbon atoms are 1,2,3,6-tetrahydrophthalic anhydrides of the formula

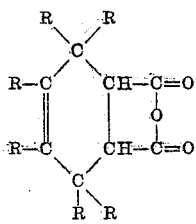

where R denotes hydrogen, methyl or ethyl and in which the sum of the carbon atoms in the total R substituents is less than 3. Products obtained from maleic anhydride and a cyclic conjugated dienic hydrocarbon possess a bicyclic hydrocarbon ring structure, the adduct of cyclopentadiene and maleic anhydride being 3,6-endomethylene-1,2,3,6-tetrahydrophthalic anhydride

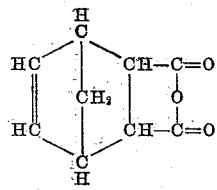

For production of the present viscous adducts, it is preferable to first esterify the Diels-Alder maleic anhydride-diene addition product by condensing it with a fatty alcohol of from 1 to 8 carbon atoms and then react the esterified addition product with the alkyl fumarate, whereby there occurs addition of the esterified product with the fumarate. While I do not know the mechanism by which addition of the fumarate to the Diels-Alder product occurs, it probably takes place at the carbon atom or atoms which are α- to the carbon atoms attached to the olefinic double bond of said Diels-Alder product. Depending upon the reaction conditions and the nature of the fumarate and Diels-Alder product, from 1 to 2 moles of fumarate add to said product. Hence the present compounds have from 4 to 6 carboxylate groups, two groups being present originally in the maleic anhydride-diene addition product, 2 carboxylate radicals being introduced upon addition of one mole of an alkyl fumarate to the Diels-Alder product, and two additional carboxylate radicals being introduced upon addition of a second mole of an alkyl fumarate. Generally the product is a mixture of adducts in which from 1 to 2 moles of the fumarate have added to one mole of the Diels-Alder product.

Although it is preferred to esterify the maleic anhydride-diene Diels-Alder addition product prior to reaction with the alkyl fumarate, if desired the Diels-Alder product, i.e., the tetrahydrophthalic anhydride compound, may be reacted first with the alkyl fumarate, and then with a fatty alcohol to effect esterification of the anhydride group of the alkyl fumarate-tetrahydrophathalic anhydride adduct.

Reaction of the esterified or unesterified Diels-Alder addition product with the alkyl fumarate to form the present viscous adducts takes place readily by heating a mixture of the fumarate and the Diels-Alder product in the presence or absence of an inert diluent or solvent at ordinary or superatmospheric pressures. When operating at atmospheric pressure, temperatures of from, say, 125° C. to 300° C., and preferably of from 150° C. to 225° C., are used. The number of carboalkoxy groups introduced into the Diels-Alder addition product depends upon the nature of said product, upon the nature of the individual fumarate used, and upon the reaction conditions employed. Generally, operation within the higher temperature ranges, i.e., at temperatures of above, say 180° C. and below the decomposition point of any of the reactants, leads to introduction of more carboalkoxy groups than does operation at the lower temperatures. The degree of introduction of carboalkoxy groups also depends upon the individual fumarate employed. Usually alkyl fumarates having 4 or 5 carbon atoms in the alkyl radical are more reactive then either the lower or the higher alkyl fumarates. In view of the effect of the reaction conditions and nature of the fumarates upon the extent of introduction of carboalkoxy groups, it is recommended that for each initial run there be experimentally determined the operating conditions which should be observed for obtaining the desired degree of introduction of such groups.

The quantity of fumarate introduced into the Diels-Alder product will also depend upon its availability in the reaction mixture. Obviously, for the formation of adducts in which at least one mole of the fumarate has added to one mole of the Diels-Alder product, the equivalent amount of fumarate must be present in the reaction mixture.

Since the presently useful fumarates are miscible with the Diels-Alder products under the reaction conditions used, no extraneous solvent or diluent need be employed. However, in some instances, it may be advantageous to work with a solution of the Diels-Alder product in an inert, extraneous diluent or solvent, e.g., a liquid hydrocarbon or a liquid derivative thereof, such as a high-boiling aliphatic hydrocarbon, e.g., kerosene. When operating at atmospheric pressure such diluent is generally removed before reaction of the Diels-Alder product with the fumarate occurs, due to the high temperatures used. For successful reaction, the diluent may or may not be present.

The present Diels-Alder product-alkyl fumarate adducts are stable, high-boiling viscous liquids which are advantageously employed for a variety of industrial purposes, for example, as textile-treating agents and as lubricant additives. They are particularly valuable as plasticizers for vinyl chloride polymers. The present adducts are completely compatible with such polymers and show no exudation of plasticizer even at plasticizer contents of up to 50 percent. Although the quantity of plasticizer will depend upon the particular polymer to be plasticized and upon its molecular weight, it is generally found that compositions having from 5 percent to 50 percent by weight of the present plasticizer will, in most cases, be satisfactory for general utility. The good flexibility of the plasticized compositions increases with increasing plasticizer concentration.

In evaluating plasticizer efficiency, use is made of the following empirical testing procedures:

*Compatability.*—Visual inspection of the plasticized composition is employed, incompatability of the plasticizer with the polymer being demonstrated by cloudiness and exudation of the plasticizer.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i.e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized compositions' usefulness as an elastomer.

*Volatility.*—Just as a decrease in temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization, the plasticized composition becomes stiff and hard. The test for plasticizer volatility herein employed is a modified carbon absorption test of the Society of Plastics Industry.

*Water resistance.*—The amount of leaching that takes place is determined when the plasticized composition is immersed in distilled water for 24 hours.

The invention is further illustrated, but not limited, by the following examples:

*Example 1*

To a flask equipped with mechanical stirrer, thermometer and a Dean and Stark trap carrying a reflux condenser, there was charged a mixture of 112.8 g. (0.4 mole) of n-butyl 1,2,3,6-tetrahydrophthalate (obtained by esterifying the Diels-Alder butadiene-maleic anhydride adduct with n-butanol) and 181 g. (0.8 mole) of n-butyl fumarate. The mixture, $n_D^{25}$ 1.4511, was heated in a nitrogen atmosphere for 4 hours at a temperature of from 270° C. to 276° C. (refluxing). Distillation of the resulting reaction mixture to remove material boiling below 215° C./1 mm., gave as residue 169.0 g. of the viscous n-butyl fumarate - n - butyl 1,2,3,6 - tetrahydrophthalate adduct, $n_D^{25}$ 1.4861.

*Example 2*

Employing the equipment described in Example 1, a mixture consisting of 141 g. (0.5 mole) of n-butyl 1,2,3,6-tetrahydrophthalate and 228 g. (1.32 moles) of ethyl fumarate was heated in a nitrogen atmosphere for 13 hours at a temperature of from 220° C. to 225° C. (refluxing). The refractive index of the mixture rose from $n_D^{25}$ 1.4472 to $n_D^{25}$ 1.4518 during the heating period. Distillation of the resulting reaction mixture to remove material boiling below 208° C./1 mm. gave as residue 47.2 g. of the viscous ethyl fumarate n-butyl 1,2,3,6-tetrahydrophthalate adduct, $n_D^{25}$ 1.4705.

*Example 3*

A mixture consisting of 117.6 g. (0.4 mole) of n-butyl 3,6-endomethylene-1,2,3,6-tetrahydrophthalate (obtained by esterifying the Diels-Alder cyclopentadiene-maleic anhydride adduct with n-butanol) and 181 g. (0.8 mole) of n-butyl fumarate was charged to a flask equipped with a mechanical stirrer, thermometer and a Dean and Stark trap carrying a reflux condenser. The mixture, having $n_D^{25}$ 1.4535, was heated in a nitrogen atmosphere at 240° C. to 258° C. (refluxing) for 5.5 hours. Distillation of the resulting mixture to remove material boiling below 206° C./1 mm. gave as residue 105 g. of the viscous n-butyl fumarate-n-butyl 3,6-endomethylene-1,2,3,6-tetrahydrophthalate adduct, $n_D^{25}$ 1.4779.

*Example 4*

Sixty parts by weight of polyvinyl chloride and 40 parts by weight of the adduct of Example 1 were mixed on a rolling mill to a homogeneous blend. During the milling there was observed substantially no fuming or discoloration. A molded sheet of the mixture was clear and transparent and substantially colorless. Testing of the molded sheet for low temperature flexibility, according to the testing procedure described above, gave a value of minus 11.2° C. Testing of the volatility characteristics of the plasticized composition gave a value of 1.3 percent, which shows very good retention of plasticizer and indicates good temperature characteristics of the composition. When subjected to heat at a temperature of 325° F. for a period of 30 minutes the clarity and color of the molded product was substantially unchanged. Testing of the water resistance of the plasticized material employing the test procedure described above showed a solids-loss of only 0.05 percent and a 1.02 percent water absorption value.

When the adduct of Example 2 was tested as a plasticizer for polyvinyl chloride employing the proportions and procedure used above for the adduct of Example 1, there was obtained a clear, compatible plasticized material having a volatility value of 1.2 percent, a solids-loss value of 0.02 percent and a water-absorption value of 0.75 percent. Similar testing of the adduct of Example 3 in the 60:40 polyvinyl chloride:adduct proportions gave a clear, homogeneous test specimen having a volatility value of 0.6 percent, a solids-loss value of 0.03 percent, and a water-absorption value of 0.53 percent. The kerosene resistance of a molded test specimen of polyvinyl chloride plasticized with 40 percent by weight of the adduct of Example 3 was determined as follows:

A 2" diameter 40 mil. disc was suspended in a 50° C. oven for a 3-hour conditioning period to eliminate water, then cooled and weighed. The conditioned sample was then immersed in 400 ml. of kerosene for a period of 24 hours, at 27° C. The sample was then removed from kerosene, blotted dry and suspended in a force-draft 80° C. oven for 4 hours. The sample was then cooled and weighed. The percent loss in weight was reported as the kerosene extraction value. There was thus obtained a kerosene extraction value of 0.1 percent.

While the above example shows only compositions in which the ratio of plasticizer to polymer content is 40:60, this ratio being employed in order to get comparable efficiencies, the content of adduct to polyvinyl chloride may be widely varied, depending upon the properties desired in the final product. For many purposes a plasticizer content of, say, from only 10 percent to 20 percent is preferred. The present adducts are compatible with polyvinyl chloride over wide ranges of concentrations, up to 50 percent of esters based on the total weight of the plasticized composition yielding desirable products.

Although the invention has been described particularly with reference to the use of the present adducts as plasticizers for polyvinyl chloride, they are advantageously employed also as plasticizers for copolymers of vinyl chloride, for example, the copolymers of vinyl chloride with vinyl acetate, vinylidene chloride, etc. Preferably, such copolymers have a high vinyl chloride content, i.e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes, it may be advantageous to use known stabilizers in the plasticized compositions. Inasmuch as the present adducts are substantially unreactive with the commercially available heat and light stabilizers which are commonly employed with polyvinyl chloride of copolymers thereof, the presence of such materials in the plasticized materials does not impair the valuable properties of the present esters. The present adducts are of general utility in softening vinyl chloride polymers. They may be used as the only plasticizing component in a compounded vinyl chloride polymer or they may be used in conjunction with other plasticizers.

This application is a division of my copending application, Serial No. 492,300, filed March 4, 1955, and now U.S. Patent No. 2,850,523, issued September 2, 1958.

What I claim is:

1. A resinous composition comprising polyvinyl chloride plasticized with the adduct of from 1 to 2 moles of an alkyl fumarate having from 1 to 8 carbon atoms in the alkyl radical and 1 mole of an alkyl 1,2,3,6-tetrahydrophthalate having from 1 to 8 carbon atoms in the alkyl radical, said adduct having been prepared by heating said fumarate with said tetrahydrophthalate at a temperature of 150° C. to 300° C., and being from 5 to 50% by weight of the composition.

2. A resinous composition comprising polyvinyl chloride plasticized with the adduct of from 1 to 2 moles of an alkyl fumarate having from 1 to 8 carbon atoms in the alkyl radical and 1 mole of an alkyl 3,6-endomethylene-1,2,3,6-tetrahydrophthalate having from 1 to 8 carbon atoms in the alkyl radical, said adduct having been prepared by heating said fumarate with said tetrahydrophthalate at a temperature of 150° C. to 300° C., and being from 5 to 50% by weight of the composition.

3. A resinous composition comprising a vinyl chloride polymer plasticized with the adduct of from 1 to 2 moles of butyl fumarate and 1 mole of butyl 1,2,3,6-tetrahydrophthalate, said adduct having been prepared by heating said fumarate with said tetrahydrophthalate at a temperature of 150° C. to 300° C., and being from 5 to 50% by weight of the composition.

4. A resinous composition comprising polyvinyl chloride plasticized with the adduct of from 1 to 2 moles of ethyl fumarate and 1 mole of butyl 1,2,3,6-tetrahydrophthalate, said adduct having been prepared by heating said fumarate with said tetrahydrophthalate at a temperature of 150° C. to 300° C., and being from 5 to 50% by weight of the composition.

5. A resinous composition comprising polyvinyl chloride plasticized with an adduct of from 1 to 2 moles of an alkyl fumarate having from 1 to 8 carbon atoms in the alkyl radical and one mole of a partially hydrogenated phthalate compound selected from the class consisting of an alkyl 1,2,3,6-tetrahydrophthalate having from 1 to 8 carbon atoms in the alkyl radical and an alkyl 3,6 - endomethylene - 1,2,3,6-tetrahydrophthalate having from 1 to 8 carbon atoms in the alkyl radical, said adduct having been prepared by heating said fumarate with said tetrahydrophthalate at a temperature of 150° C. to 300° C. and being from 5 to 50% by weight of the composition.

No references cited.